United States Patent [19]
Roberts

[11] 3,955,992
[45] May 11, 1976

[54] CEMENTITIOUS WALL COMPOSITION AND METHOD

[76] Inventor: Albert Lee Roberts, 4309 Paseo De Las Tortugas, Torrance, Calif. 90505

[22] Filed: Dec. 17, 1973

[21] Appl. No.: 424,939

[52] U.S. Cl. ................................ 106/90; 106/92; 106/93; 106/95; 106/98; 260/29.6 S
[51] Int. Cl.$^2$ ........................ C04B 7/02; C04B 9/35
[58] Field of Search ............ 106/90, 98; 260/29.6 S, 260/92, 93, 95

[56] References Cited
UNITED STATES PATENTS

| | | | |
|---|---|---|---|
| 2,868,753 | 1/1959 | Morgan et al. ................. | 260/29.6 S |
| 3,759,729 | 9/1973 | Fahn ..................................... | 106/90 |
| 3,853,577 | 12/1974 | Nishida et al. ......................... | 106/90 |

*Primary Examiner*—J. Poer
*Attorney, Agent, or Firm*—George F. Smyth

[57] ABSTRACT

A cementitious composition suitable for spray application in formation of a dense wall structure. The composition has a Brookfield viscosity of about 4,000 to about 9,000 centipoises (cps) as measured at 20 rpm with a number 3 spindle and contains about 50 to about 65 percent by weight of substantially spherical quartz sand having an average particle size of about 87 mesh to about 20 mesh. In addition, the composition has a low water-to-cement ratio in the range of about 0.3 to about 0.5, and contains a plastic-in-water emulsion composed of minute spherical plastic particles which intermesh with the spherical quartz to provide a dense wall structure having a low void content. The emulsion has a solids content of about 20 percent to about 50 percent by weight of the emulsion and, in addition, the composition contains a flow control material, such as a high molecular weight poly(ethylene oxide), and optionally a gel retarder. The flow control material is present in an amount sufficient to provide the composition with laminar flow properties during spraying while the gel retarder may be present in an amount sufficient to provide a gel time between about 1 and about 6 hours.

A method for forming a relatively dense cementitious wall which has a low percentage of voids and very little shrinkage during curing which comprises spraying the above described composition through a nozzle onto a substantially vertical supporting surface.

31 Claims, No Drawings

CEMENTITIOUS WALL COMPOSITION AND METHOD

In the formation of a cementitious wall structure, the quantity of water in the composition is of considerable importance in determining the properties of the wall structure. It is generally known that the quantity of water in a cementitious composition should be kept to a minimum since the evaporation of excess water can cause crazing with the formation of surface cracks. Also, the presence of excess water can produce voids within the cured structure which reduces its strength.

Even though it is known to be desirable to reduce the quantity of water in a cementitious composition to a minimum, there has been no practical way to accomplish this and have a composition with good application properties such that the composition can be applied by spraying. The minimum amount of water required is the quantity of water that is taken up in hydration of the calcium silicate compounds during cure of the cement. However, when the amount of water is reduced to the minimum amount required for hydration, the composition is then so thick that it has poor application properties and can only be applied by extensive working operations such as troweling.

When the quantity of water in the cementitious composition is increased above the minimum amount for hydration, the application properties of the composition are improved and it may then be made pourable and sprayable through proper adjustment of the water content. However, in achieving the desired application properties, the excess water in the cement may produce voids in the cured cementitious structure and also may produce crazing.

In providing a solution to the aforementioned problems, it would be desirable to have a cementitious composition that would be suitable for formation of a wall structure by application through a technique such as spraying but which would contain a minimum amount of water and would produce a dense cured cementitious structure having a low void content. Such a composition would provide an improved wall structure which cannot presently be obtained by an application procedure such as spraying. Also, such a composition would provide a wall structure which is free from surface cracking or crazing that may result from the presence of excess water.

In providing a solution to the aforementioned problems, the present composition has good application properties with a Brookfield viscosity of about 4,000 to about 9,000 cps, and preferably about 6,000 to about 8,000 cps, as measured at 20 rpm with a Brookfield Synchroelectric Viscometer, Model LVF, using a number 3 spindle and may be applied to a generally vertical support surface in forming a cementitious wall through use of time-saving application procedures such as spraying. Also, however, the compositions of the invention have very low water-to-cement ratios and produce a cured wall structure that is relatively free from voids and the presence of surface cracking or crazing that results from the presence of excess water.

The principal ingredient in the present composition is a finely divided substantially spherical quartz sand which is present in an amount of about 50 to about 65 and preferably in an amount of about 56 to about 60 percent by weight. Preferably, the finely divided quartz has an average particle size of about 87 mesh although the particle size may be varied, for example, from about 87 to about 20 mesh (U.S. Standard Sieve Series).

In addition to the quartz sand, the composition contains a plastic-in-water emulsion in which the plastic is present as minute spherical particles having a particle size of about 0.05 to about 50 microns and preferably about 0.1 to about 10 microns. The plastic in the emulsion may be any of the known materials used in plastic-in-water emulsions which is a film former and is capable of forming a tacky film at ambient temperatures through coalesence of the minute plastic spherical particles. Additionally, the plastic is a material which will bond to the substantially spherical quartz sand.

As examples of the various plastic-in-water emulsions which may be employed in the present composition, there are the acrylics in which the plastic is a polymer based on an ester of an acrylic acid, e.g., methyl methacrylate, ethylhexylacrylate, or a copolymer of acrylonitrile and butadiene, etc.; alkyds which comprise an oil-modified polyester resin formed from reaction of a polybasic acid such as phthalic anhydride, maleic anhydride, etc., with a polyhydric alcohol such as glycerine, pentaerythritol, etc., and the fatty acids of soya, linseed, dehydrated castor oil, etc., and optionally containing a material such as polyethylene glycol to provide improved water dispersibility; amino resins such as urea-formaldehyde, melamine-formaldehyde and the like which may be used in combination with alkyds, epoxies, etc., and bituminous coatings such as petroleum and natural asphalts, coal tar and pitch products.

Still further examples of plastics for plastic-in-water emulsions are the cellulosics such as nitrocellulose, ethyl cellulose and cellulose butyrate; drying oils which are triglycerides of long chain fatty acids with small amounts of phosphatides, carbohydrates and other impurities, e.g., linseed oil tung oil, safflower oil, etc., which may be combined with resins such as phenolics, maleics, etc.; epoxies which are condensation products of epichlorohydrin and bisphenol or their derivatives; fluorocarbons; hydrocarbon resins such as terpene resins, coumaroneindene resins, petroleum resins, etc.; phenolics; polyamides; polyethylenes; rubbers such as chlorinated rubber, polychloroprene, polysulfides, etc.; styrene, and vinyl resins such as polyvinyl acetate, polyvinyl chloride and polyvinyl butyrals.

Plastic-in-water emulsions of various types, as listed above, are well known and any of the various plastic-in-water emulsions may be used in the present composition although the acrylic emulsions are preferred. However, as stated, the plastic in the emulsion must be present in the form of minute spheres and the plastic must be capable of forming a tacky film at ambient temperatures and of bonding to the spherical quartz particles and other solid materials in the composition.

While not being bound by any theory, it is believed that the form of the plastic material in the emulsion as minute spherical particles is of considerable importance in the functioning of my composition. The spherical form of the minute plastic particles is believed to enhance the desired flow properties of the composition which permit its application through spraying. Additionally, the spherical form of the plastic particles and their minute size provides intermeshing of the plastic particles with the quartz particles such that the plastic particles fill in the interstices between the spherical quartz sand particles to provide a structure having improved bond strength, felxibility, chemical inertness, resistance to attack by acids, freeze-thaw stability, and water-proof characteristics.

In general, the solids content of the emulsion may range from about 20 to about 50 percent by weight of the emulsion. Preferably, however, the solids content is about 32 to 40 percent by weight and most preferably about 35 percent by weight of the emulsion.

In addition to the substantially spherical quartz sand and the plastic-in-water emulsion, there is also present a finely ground Portland cement which is composed principally of calcium silicates such as dicalcium silicate, tricalcium silicate, and calcium aluminum silicate. Portland cement is available in various grades which are denoted Grades I-IV. Portland cements may be graded, for example, on the basis of their tolerance to high concentrations of sulfate ions, their rate of gel time, their suitability for application in cold climates, and the time required to achieve high strength.

While various Portland cements may be used in the present compositions, the use of a white general purpose Portland cement is preferred since the cementitious composition can then be suitably colored by adding a small quantity of a pigment which is unreactive with water such as iron oxide, chromium oxide or titanium dioxide. Further, Portland cement which is used in the cementitious compositions of the invention is preferably not a high early strength cement which could set up and harden in spray application equipment and, thereby, make the equipment unusable.

As stated, the water/cement ratio in the present cementitious compositions is between about 0.3 to about 0.5 and is preferably within the range of about 0.35 to about 0.40. Also, the content of Portland cement is preferably about 24 to about 27 percent by weight. In general, the water which is present in the compositions is supplied entirely by the water in the emulsion. Thus, in formulating the cementitious compositions, it is not necessary to add additional water.

In addition to the foregoing ingredients, there is also present a flow control material, such as a high molecular weight polyethylene oxide or a water soluble gum. The function of the flow control material is to give the cementitious composition laminar flow properties such that it can be suitably pumped through conventional spray equipment of the type used for the application of stucco. Such spray equipment, as exemplified by Durasurf Pump and Spray Machine, Model D-101, sold by Durasurf Corporation, a Division of Bruner Pacific Marble and Granite, Inc. Pico Rivera, California, functions by conveying the cementitious compositions to a spray nozzle supplied with air with the air flow rate being sufficient to break up the composition into small blobs which are blown against a generally vertical support surface.

Flow control materials are, in general, high molecular weight, long chain, water soluble polymers. Examples of flow control materials are carboxymethyl cellulose, irish moss extract, guar gum, polyacrylamide, and poly(ethylene oxide) resins. During flow, the long chains of the flow control material tend to line up with each other and to resist a change in the flow pattern which would disturb this alignment. In this manner, the presence of the flow control material assists in maintaining laminar flow by resisting a turbulent flow pattern which would disturb the alignment of the long chain molecules of the flow control material.

Polyacrylic latices which have been found satisfactory as a plastic-in-water emulsion for use in the present compositions may be obtained from the Rohm and Haas Company, Philadelphia, Pennsylvania under the trademark Rhoplex. As an example, a polyacrylic emulsion denoted Rhoplex MC-76 or E-764 may be obtained as a milky white opaque dispersion having a solids content of 47 ±1.0 percent, a pH of 9.4 to 9.9, a specific gravity of 1.054 and a density of 8.8 pounds per gallon.

In the use of high molecular weight poly(ethylene oxide) as the flow control agent, preferably having a molecular weight in the order of about 3,000,000 to about 6,000,000, the poly(ethyleneoxide) may, for example, be present at a concentration range of about 0.0005 to about 0.004 percent by weight of the overall composition. A preferred concentration is about 0.001 to about 0.002 percent by weight and the most preferred concentration is about 0.0016 to about 0.0017 percent by weight. High molecular weight poly(ethylene oxide) is available from Union Carbide Corporation, Chemicals and Plastics Development Division, 270 Park Avenue, New York, New York, 10017, under the trademark Polyox.

A further ingredient which may be present in the compositions is a gel retarder which may be present in an amount sufficient to provide a gel time for the composition of between about 1 and about 6 hours. Additionally, the gel retarder functions to decrease the gel size and to reduce the water demands of the composition.

Gel retarders are known materials and, in general, may contain a metallic salt of a hydroxylated carboxylic acid as the active ingredient. As an example, a suitable gel retarder is obtainable from Sika Chemical Corporation under the trademark Plastiment Concrete Densifier. If present, the content of the gel retarder generally ranges from about 0.02 to about 0.06 and preferably about 0.03 to about 0.05 percent by weight of the composition. However, since the affect of the gel retarder may vary depending on the particular Portland cement in the composition, the content of the gel retarder may be varied or in some cases eliminated to suit the particular Portland cement in providing a gel time of about 1 to about 6 hours while reducing the gel size so as to reduce shrinkage of the composition through evaporation of water after gellation has occurred.

Optionally, the composition may also contain a minor amount of a gel accelerator such as calcium chloride or sodium hydroxide. Such a material may be employed, for example, if the effect of the gel retarder is too pronounced for a particular Portland cement with the result that the composition would have an excessive gel time in the absence of a gel accelerator.

In application of the present cementitious compositions to a generally vertical support surface in forming a wall structure, it is necessary that the cementitious material flow to some extent after striking the vertical surface to provide a wall surface which is reasonably level. Also, however, it is necessary that the cementitious material be sufficiently viscous so that it will adhere to the vertical support surface and will not run and sag. In providing these flow properties, it is desirable that the viscosity characteristics of the cementitious composition be thixotropic. Thus, under the effect of high shear forces at the spray nozzle, the viscosity of the composition is reduced sufficiently to permit spray application. On striking the support surface, the cementitious composition is also subjected to high shear and its viscosity is, thereby, reduced to a sufficient extent to permit flow and leveling and also to permit the escape of air which is entrained in the composition. However, after striking the support surface, the viscosity of the cementitious material increases sufficiently to prevent its sagging or dripping from the vertical support surface.

One means of describing a material having thixotropic viscosity characteristics is in terms of its thixotropic index which may be expressed as the Brookfield viscosity of the material at a spindle speed of 2 rpm divided by the Brookfield viscosity of the material at a spindle speed of 20 rpm. In referring to Brookfield viscosities, reference is made to a Brookfield Synchroelectric Viscometer, Model LVF, which may be used with the appropriate spindle in determining the thixotropic index.

As stated, the cementitious compositions of the invention have some degree of thixotropy. Preferably, the thixotropic index of the cementitious compositions ranges from about 3.5 to about 4.

To further illustrate the invention, there is presented the following example in which all parts and percentages are by weight unless otherwise indicated.

EXAMPLE

A dry mixture was formed by admixing 59.55 parts of a near spherical quartz sand having an average particle size of 87 mesh (U.S. Standard Sieve Series) with 25.52 parts of a finely divided white general purpose Portland cement. The quartz sand was Oklahoma No. 1, obtained from Pennsylvania Glass Sand Company, and the white Portland cement was obtained from Riverside Cement Company, Riverside, California. A liquid mixture was also made up by admixing 14.8834 parts of a plastic-in-water emulsion (Rhoplex emulsion MC-76) diluted with water to a solids content of 35 percent with 0.0450 parts of a gel retarder (Plastiment Concrete Densifier from Sika Chemical Corporation) and 0.0016 parts of a high molecular weight poly(ethylene oxide) flow control material (Polyox FRA from Union Carbide Corporation). The liquid mixture was then added to a mixing vessel and the dry mixture was added slowly to the vessel. After mixing for about two minutes, the dry mixture and liquid mixture were blended to substantial homogeneity and the resulting mixture was in condition for spray application to a generally vertical supporting surface in forming a dense wall structure.

Before applying the cementitious composition to a support surface, the support surface is preferably primed with a plastic-in-water emulsion, as described previously, and the emulsion is allowed to dry for about 10 minutes or more. This insures a better bond between the cementitious composition and the support surface.

In the foregoing description and example, reference has been made to average particle size in describing the substantially spherical quartz particles. The average particle size is used in industry in referring to material which passes through a commercial screen having a specified number of mesh openings per inch. Due to the manner in which commercial screening is conducted, the particles passing through a commercial screen having a specified number of mesh openings per inch will not be uniformly sized to the degree that is obtained in laboratory screening. Thus, the particles passing through a commercial screen have a particle size distribution which is typical of materials that are commercially screened through a screen having the specified number of mesh openings per inch.

By way of example, a typical screen analysis for substantially spherical quartz particles (Oklahoma No. 1 quartz sand) having an average particle size of 87 mesh is as follows:

| Retained on | 40 mesh | 0.10% |
|---|---|---|
| do. | 50 mesh | 1.30% |
| do. | 70 mesh | 12.80% |
| do. | 100 mesh | 40.10% |
| do. | 140 mesh | 35.30% |
| do. | 200 mesh | 8.90% |
| thru | 200 mesh | 1.50% |

The above typical screen analysis for material having an average particle size of 87 mesh is obtained with laboratory screening equipment in which a weighed amount of material is placed on the uppermost screen in a series of stacked laboratory screens (U.S. Standard Sieve Series). On shaking the screens, the material on the uppermost screen then progressively moves through the series of screens with a certain percentage of the material being retained on each of the screens. After shaking the stacked screens for an extended time period, the screens are then separated and the material on each of the screens is weighed to determine the percentage of material retained on the particular screen.

A typical screen analysis for substantially spherical quartz particles (Ottawa Flint Shot) having an average particle size of 27 mesh is obtained in a similar manner to that described above. The typical screen analysis (U.S. Standard Sieve Series) for this material was as follows:

| Retained on 30 mesh | 30% |
|---|---|
| Retained on 40 mesh | 60% |
| thru 40 mesh | 10% |

As the average particle size of the substantially spherical quartz sand is increased, the particles become visible to the naked eye so that the surface of the resulting wall structure does not appear as smooth. Also, when the average particle size of the quartz sand is increased, the cementitious composition may become more difficult to spray.

When the average particle size of the substantially spherical quartz sand is decreased, the water demand of the cementitious composition may increase which will cause a reduction in the strength of the resulting wall structure. Also, the viscosity of the cementitious composition may increase which will make the composition more difficult to apply through an application procedure such as spraying. These criteria, thus, guide the selection of the average particle size of the substantially spherical quartz sand for a particular composition.

The present compositions may be used in various ways in constructing a dense wall structure. As described, the material may simply be sprayed onto a substantially vertical supporting surface, generally to a depth of about 1/16 to about ⅛ inches. On contact of the composition with the surface, the viscosity characteristics of the composition are such that air which is retained within the composition is expelled. Also, the composition has a viscosity that provides a substantially textured surface. Due to the manner of its general application by spraying, the surface of the wall structure may be grossly textured with surface undulations when viewed as a large area. However, when viewed as a small area, the surface will appear smooth.

In forming a wall structure, any suitable decorative stone chips, such as marble or granite chips, may be embedded in the cementitious material to give a decorative surface. Thus, after applying the cementitious composition to the generally vertical support surface, the chips may be blown against the cementitious material through a spray nozzle, or may be applied in any other suitable manner, or by hand. The present compositions form a firm bond with the chips such that the chips have less tendency to pop out or to become dislodged.

In another application, the present compositions may be used in resurfacing a floor structure in an area which does not receive excessive wear. In this application, the composition is applied as a thin layer, e.g., about 1/32 to about ⅛ inches thick, through use of a roller, such as a paint roller, or through spray application coupled with rolling.

As demonstrated in the foregoing specifications, the present compositions have good application properties and may be applied to a substantially vertical surface through time-saving procedures such as spraying. The compositions have good adherence to various materials such as wood, sheet metal, or concrete which may form the generally vertical support surface.

In addition to having good application properties, the present compositions have low water/cement ratios and produce a wall structure which is extremely hard and abrasion resistant in comparison to concrete. The resulting wall structure is also relatively free from voids and crazing and is quite dense in comparison to concrete. These properties provide a wall structure which is relatively non-porous and which is easily cleaned. In addition, the resulting wall structure has improved strength, is more chemically inert and more resistant to attack by acids such as fatty acids used in food processing operations, has improved freeze-thaw stability and has improved water-proof characteristics.

I claim:

1. A cementitious composition suitable for spray application in the formation of a dense wall structure, said composition comprising:
   about 50 to about 65 percent by weight of substantially spherical quartz sand having an average particle size of about 87 mesh to about 20 mesh;
   a finely ground Portland cement;
   a plastic-in-water emulsion having a solids content of about 20 to about 50 percent by weight of the emulsion;
   the plastic in said emulsion being present in the form of minute spherical particles having a particle size of about 0.05 to about 50 microns and said plastic being capable of forming a tacky film at ambient temperatures and bonding to said substantially spherical quartz sand;
   a high molecular weight, long chain, water soluble polymeric flow control material in an amount sufficient to provide the composition with laminar flow properties during spray application;
   said composition having a low water-to-cement ratio in the range of about 0.3 to about 0.5;
   said composition having a Brookfield viscosity of about 4,000 to about 9,000 centipoises as measured at 20 rpm with a Brookfield Synchroelectric Viscometer, Model LVF, using a number 3 spindle, and
   said composition having thixotropic viscosity characteristics,
   whereby said composition may be sprayed onto a generally vertical support surface in the formation of a dense wall structure having a low void content and substantially free from surface cracking or crazing with said composition being sufficiently viscous so that it will adhere to the generally vertical support surface without running and sagging.

2. The cementitious composition to claim 1 wherein said water-to-cement ratio is between about 0.35 to about 0.40.

3. The composition of claim 1 including a small quantity of a gel retarder in an amount sufficient to provide a gel time for said composition between about 1 and about 6 hours while decreasing the gel size of said composition.

4. The composition of claim 1 wherein said substantially spherical quartz sand has an average particle size of about 87 mesh.

5. The composition of claim 1 wherein said flow control material is a high molecular weight poly(ethylene oxide) resin.

6. The composition of claim 1 wherein
   said Portland cement is a general purpose Portland cement, and
   the content of said Portland cement is about 24 to about 27 percent by weight of the composition.

7. The composition of claim 5 wherein said poly(ethylene oxide) resin has a molecular weight of about 3,000,000 to about 6,000,000, and
   said resin is present at a concentration level of about 0.0005 to about 0.004 percent by weight of the composition.

8. The composition of claim 7 wherein said poly(ethylene oxide) resin is present at a concentration of about 0.001 to about 0.002 percent by weight of the composition.

9. The composition of claim 8 wherein said poly(ethylene oxide) resin is present at a concentration of about 0.0016 to about 0.0017 percent of the composition.

10. The composition of claim 1 wherein said plastic-in-water emulsion is an acrylic emulsion.

11. The composition of claim 10 wherein the acrylic plastic in said emulsion is present in the form of minute spherical particles having a particle size of about 0.1 to about 10 microns.

12. The composition of claim 11 wherein the solids content of said emulsion is about 32 to about 40 percent by weight of said emulsion.

13. The composition of claim 12 wherein the viscosity of said composition is about 6,000 to about 8,000 centiposes as measured at 20 rpm with a Brookfield Synchroelectric Viscometer, Model LVF, using a number 3 spindle.

14. The composition of claim 1 wherein said substantially spherical quartz sand is present in an amount of about 56 to about 60 percent of the composition.

15. The composition of claim 13 wherein said substantially spherical quartz sand is present in an amount of about 56 to about 60 percent of the composition.

16. The composition of claim 15 wherein said flow control material is a poly(ethylene oxide) resin having a molecular weight of about 3,000,000 to about 6,000,000, and said resin is present at a concentration of about 0.0016 to about 0.0017 percent of the composition.

17. The composition of claim 16 including a small quantity of a gel retarder in an amount sufficient to provide a gel time for said composition between about 1 and about 6 hours while decreasing the gel size of said composition.

18. The composition of claim 17 wherein said Portland cement is a general purpose Portland cement, and
the content of said Portland cement is about 24 to about 27 percent by weight of the composition.

19. The composition of claim 18 wherein said composition has a thixotropic index of about 3.5 to about 4.0.

20. A cementitious composition suitable for spray application in the formation of a dense wall structure, said composition comprising:
from about 50 to about 65 percent by weight of a substantially spherical quartz sand having an average particle size of about 87 mesh;
a finely divided Portland cement;
a plastic-in-water emulsion having a solids content of about 32 to about 40 percent by weight;
said plastic being present in the emulsion in the form of minute spheres having a particle size of about 0.1 to about 10 microns;
said plastic being an acrylic plastic which is capable of forming a tacky film at ambient temperatures and bonding to the substantially spherical quartz sand through coalescence of the minute plastic spherical particles;
a poly(ethylene oxide) flow control material at a concentration of about 0.001 to about 0.002 percent by weight sufficient to provide the composition with laminar flow characteristics during spray application;
said composition having a water-to-cement ratio in the range of about 0.35 to about 0.40;
said composition having a Brookfield viscosity of about 6,000 to about 8,000 centiposes as measured at 20 rpm with a Brookfield Synchroelectric Viscometer, Model LVF, using a number 3 spindle, and
said composition having thixotropic viscosity characteristics such that the viscosity of the composition is reduced by shear forces to permit spraying of the composition against a generally vertical support surface with the viscosity of the composition increasing after contact with the support surface to provide adherence of the composition to the support surface without running and sagging.

21. The composition of claim 20 wherein substantially spherical quartz sand is present in a concentration of about 56 to about 60 percent by weight.

22. The composition of claim 20 wherein said composition has a thixotropic index ranging from about 3.5 to about 4.

23. The composition of claim 20 wherein said poly (ethylene oxide) flow control material has a molecular weight of about 3,000,000 to about 6,000,0000, and
said flow control material is present at a concentration of about 0.0016 to about 0.0017 percent by weight.

24. The composition of claim 23 wherein said substantially spherical quartz sand is present at a concentration of about 56 to about 60 percent by weight.

25. The composition of claim 20 including a gel retarder in an amount sufficient to provide a gel time of about 1 to about 6 hours while decreasing the gel size of the composition.

26. The composition of claim 23 including a gel retarder in an amount sufficient to provide a gel time for the composition of about 1 to about 6 hours while decreasing the gel size of the composition.

27. The composition of claim 26 wherein said gel retarder is present at a concentration of about 0.02 to about 0.06 percent by weight.

28. The composition of claim 26 wherein said gel retarder is present at a concentration of about 0.03 to about 0.05 percent by weight.

29. The composition of claim 27 wherein said Portland cement is present at a concentration of about 24 to about 27 percent by weight.

30. The composition of claim 29 wherein the solids content of said plastic-in-water emulsion is about 35 percent by weight of the emulsion.

31. The composition of claim 1 wherein said composition has a gel time of about 1 to about 6 hours due to the properties of the Portland cement.

* * * * *